United States Patent Office 2,724,079
Patented Nov. 15, 1955

2,724,079

ARTIFICIAL BARRIER LAYER SELENIUM RECTIFIER

Donald W. Black, Pompton Plains, N. J., assignor to International Telephone and Telegraph Corporation, New York, N. Y., a corporation of Maryland No Drawing. Application November 29, 1954, Serial No. 471,900

2 Claims. (Cl. 317—241)

This invention relates to improvements in selenium rectifiers and more particularly to the artificial barrier layer produced between the selenium and counter electrode of such rectifiers.

In my U. S. Patent No. 2,660,698 patented November 24, 1953 there is described a selenium rectifier which has an artificial barrier layer produced from a lacquer. This lacquer is a "nylon" lacquer and consists essentially of a solution of a polyamide which may be more specifically defined as a linear polymeric carbonamide soluble in the lower aliphatic alcohols. The rectifiers thus produced are quite satisfactory, have relatively long life and are capable of being formed to about 36 volts. One of the goals in the making of selenium rectifiers is to shorten the forming time since this is one of the major bottlenecks in the mass production of such devices. It will be appreciated also that longer effective life of the selenium rectifiers is generally sought for and for many applications it is desirable to have cells which may be formed up to a higher voltage.

An object of the present invention is the provision of an improved selenium rectifier of the general type disclosed in my aforesaid U. S. Patent 2,660,698, whose forming time is lessened, which gives a longer effective life and which may be formed up to a higher voltage.

In accordance with the main feature of the present invention it has been found that by the addition of magnesium nitrate to the lacquer of my aforementioned patent, the forming time of the cells using such lacquer was shorter, the cells were able to be formed to higher voltages capable of blocking 52 volts R. M. S. and had effective lives in excess of 10,000 hours. The amount of magnesium nitrate added to the lacquer described in my aforementioned patent varied from .025 to .5 gram by weight, optimum results being obtained when the magnesium nitrate added was approximately 0.125% by weight.

More specifically, a lacquer in accordance with said U. S. patent may be prepared by using a nylon (such as that designated FM.6501 by the Du Pont Corporation) which is soluble in the lower aliphatic alcohols and which may be defined as a linear polymeric carbonamide of relatively high molecular weight. To this nylon may be added a carrier such as a nitro-paraffin in the form of, for example, a nitro-methane solution. A preferred composition of the lacquer described in my said patent would be 10 cc. of a polyamide solution comprising by weight, 2 grams of said nylon solution in 30 grams of isopropyl alcohol, while maintaining the solution at 50°–60° C., then mixing the above solution with 400 cc. of a carrier comprising isopropyl alcohol and nitro-methane in the ratio of three parts to one by volume respectively.

The pH of the lacquer solution is then adjusted to a desired value by adding thereto an appropriate amount of ammonium hydroxide.

To the lacquer thus produced there is added magnesium nitrate in the amount of from .025 to .5 gram, approximately .125% by weight being preferred.

A small amount of isopropyl alcohol sufficient to dissolve the magnesium nitrate is heated to approximately 60° C. When the magnesium nitrate has been added to and has dissolved in the isopropyl alcohol, it is added to the above-described lacquer to produce the final lacquer used as the artificial barrier layer.

While a specific composition of the lacquer to which I add magnesium nitrate has been given only by way of example, a range of the ingredients which have been found satisfactory for this lacquer is as follows:

Nylon concentrate (proportions by weight):
    4–7% nylon
    65–75% isopropyl alcohol
    10–16% water
    7–12% furfuryl alcohol Carrier (proportions by volume):
    1½–4½ parts isopropyl alcohol
    ½–1½ parts nitro-methane The lacquer is then prepared by mixing approximately 10–20 cc. of nylon concentrate with approximately 350–450 cc. of the carrier. The pH of the composition, when taking the mean of the above ranges, is approximately 5 and can be varied to a preferred value (usually 7) by adding an appropriate amount of ammonium hydroxide. Then the magnesium nitrate is added to this lacquer in the amounts indicated above.

In carrying out my invention, after mixing the nylon solution with the carrier solution, in the above mentioned proportions, adding thereto ammonium hydroxide to vary the pH factor of the solution to a desired value, then adding the magnesium nitrate, applying the lacquer to the cell and completing the cell to produce a resulting rectifier, the rectifier cell is then "formed" preferably by immersing the rectifier cell plate in oil (such as transformer oil) and applying across the plate a given current of pulsating D. C., e. g. 2 amps., until approximately 50 volts is built up. This will produce a 26 volt cell. If approximately 60 volts is built up, a 36 volt cell will be produced. At these voltages the rectifier is properly formed and is removed from the source of power. During the process the oil should be maintained at a fairly even temperature, approximately 40–50° C.

The characteristics of the rectifier are a function of the pH and the forming voltage, therefore the pH and forming voltage should be adjusted for various types of rectifiers in accordance with the requirements and specifications of the job for which it will be used.

While I have described above the principles of my invention in connection with specific apparatus, it is to be clearly understood that this description is made only by way of example and not as a limitation to the scope of my invention as set forth in the objects thereof and the accompanying claims.

What is claimed is:

1. In a rectifier having a base plate, a layer of selenium on the base plate, a counter electrode layer on the selenium; a layer intermediate the counter electrode and the selenium consisting of a film deposited from a solution of a linear polymeric carbonamide of the type soluble in the lower aliphatic alcohols and including the addition of magnesium nitrate.

2. A rectifier according to claim 1 in which the magnesium nitrate is approximately .125% by weight of the solution.

References Cited in the file of this patent

UNITED STATES PATENTS

| | | |
|---|---|---|
| 2,659,846 | Rudolph | Nov. 17, 1953 |
| 2,660,698 | Black | Nov. 24, 1953 |